(12) United States Patent
Vargantwar et al.

(10) Patent No.: US 8,055,292 B1
(45) Date of Patent: Nov. 8, 2011

(54) METHOD AND SYSTEM FOR POWER LEVEL ADJUSTMENT OF FORWARD CHANNELS

(75) Inventors: Sachin R. Vargantwar, Overland Park, KS (US); Siddharth S. Oroskar, Overland Park, KS (US); Ashvini Ganesh G. Canjeevaram, Burlington, MA (US); Manoj Shetty, Overland Park, KS (US); Deveshkumar Rai, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 738 days.

(21) Appl. No.: 12/137,833

(22) Filed: Jun. 12, 2008

(51) Int. Cl.
*H04B 7/00* (2006.01)
*H04B 1/04* (2006.01)
*H04W 72/00* (2009.01)

(52) U.S. Cl. ..... 455/522; 455/69; 455/127.1; 455/450.1

(58) Field of Classification Search ............... 455/522, 455/69, 127.1, 63.1
See application file for complete search history.

(56) References Cited

U.S. PATENT DOCUMENTS

| | | | | |
|---|---|---|---|---|
| 5,857,147 A * | 1/1999 | Gardner et al. | ............ | 455/67.11 |
| 5,914,950 A * | 6/1999 | Tiedemann et al. | .......... | 370/348 |
| 6,717,916 B1 * | 4/2004 | Ahn et al. | ...................... | 370/252 |
| 7,215,653 B2 * | 5/2007 | Kim et al. | ...................... | 370/329 |
| 7,280,510 B2 * | 10/2007 | Lohtia et al. | .................. | 370/335 |
| 7,630,731 B2 * | 12/2009 | Lundby et al. | ................. | 455/522 |
| 7,720,501 B2 * | 5/2010 | Lundby et al. | ................. | 455/522 |
| 7,742,781 B2 * | 6/2010 | Chen et al. | ..................... | 455/522 |
| 7,813,323 B1 * | 10/2010 | Talley et al. | .................. | 370/335 |
| 7,817,677 B2 * | 10/2010 | Black et al. | .................... | 370/516 |
| 7,826,441 B2 * | 11/2010 | Black et al. | .................... | 370/352 |
| 7,830,900 B2 * | 11/2010 | Black et al. | .................... | 370/412 |
| 7,852,810 B1 * | 12/2010 | Talley et al. | .................. | 370/333 |
| 7,898,952 B2 * | 3/2011 | Kim et al. | ...................... | 370/232 |
| 2003/0134655 A1 * | 7/2003 | Chen et al. | ..................... | 455/522 |
| 2009/0163238 A1 * | 6/2009 | Rao et al. | ....................... | 455/522 |
| 2010/0105406 A1 * | 4/2010 | Luo et al. | .................. | 455/452.2 |
| 2011/0045864 A1 * | 2/2011 | Chen et al. | ..................... | 455/522 |

\* cited by examiner

*Primary Examiner* — Tilahun B Gesesse

(57) ABSTRACT

A method and system is disclosed for setting forward-link power for an access terminal operating in a coverage area of a wireless communication system, whereby power is redistributed from access terminals operating in the same coverage area and having forward-link power in excess of their needs for maintaining acceptable service quality, to an access terminal that is in need of additional forward-link power in order to attain a desired or required level of service quality. Following a determination that a given access terminal is requesting a forward-link transmission power level that exceeds a first threshold power level, a number of other access terminals are identified as each having requested a respective decrease in forward-link transmission power level by an amount at least as large as a respective threshold amount. Forward link power to the given access terminal is then increased by an incremental amount, and the forward-link transmission power level to each of the number of other access terminals is decreased by a respective decremental amount, wherein the sum of all the respective decremental amounts equals at least the incremental amount.

22 Claims, 4 Drawing Sheets

METHOD AND SYSTEM FOR POWER LEVEL ADJUSTMENT OF FORWARD CHANNELS

BACKGROUND

In a typical cellular radio communication system (wireless communication system), an area is divided geographically into a number of cell sites, each defined by a radio frequency (RF) radiation pattern from a respective base transceiver station (BTS) antenna. The base station antennae in the cells are in turn coupled to a base station controller (BSC), which is then coupled to a telecommunications switch or gateway, such as a mobile switching center (MSC) and/or a packet data serving node (PDSN) for instance. The switch or gateway may then be coupled with a transport network, such as the PSTN or a packet-switched network (e.g., the Internet).

When an access terminal (such as a cellular telephone, pager, or appropriately equipped portable computer, for instance) is positioned in a cell, the access terminal (also referred to herein by "AT") communicates via an RF air interface with the BTS antenna of the cell. Consequently, a communication path is established between the AT and the transport network, via the air interface, the BTS, the BSC and the switch or gateway.

As the demand for wireless communications has grown, the volume of call traffic in most cell sites has correspondingly increased. To help manage the call traffic, most cells in a wireless network are usually further divided geographically into a number of sectors, each defined respectively by radiation patterns from directional antenna components of the respective BTS, or by respective BTS antennae. These sectors can be referred to as "physical sectors," since they are physical areas of a cell site. Therefore, at any given instant, an access terminal in a wireless network will typically be positioned in a given physical sector and will be able to communicate with the transport network via the BTS serving that physical sector.

As an access terminal moves between wireless coverage areas of a wireless communication system, such as between cells or sectors, or when network conditions change or for other reasons, the AT may "hand off" from operating in one coverage area to operating in another coverage area. In a usual case, this handoff process is triggered by the access terminal monitoring the signal strength of various nearby available coverage areas, and the access terminal or the BSC (or other controlling network entity) determining when one or more threshold criteria are met. For instance, the AT may continuously monitor signal strength from various available sectors and notify the BSC when a given sector has a signal strength that is sufficiently higher than the sector in which the AT is currently operating. The BSC may then direct the AT to hand off to that other sector.

In some wireless communication systems or markets, a wireless service provider may implement more than one type of air interface protocol. For example, a carrier may support one or another version of CDMA, such as EIA/TIA/IS-2000 Rel. 0, A (hereafter "IS-2000") for both circuit-cellular voice and data traffic, as well as a more exclusively packet-data-oriented protocol such as EIA/TIA/IS-856 Rel. 0, A, or other version thereof (hereafter "IS-856"). Access terminals operating in such systems may be capable of communication with either or both protocols, and may further be capable of handing off between them, in addition to being able to hand off between various configurations of coverage areas.

OVERVIEW

Under IS-2000, IS-856, and other CDMA or CDMA-related protocols, communications from a base station (or more specifically, the BTS) to an access terminal are carried on a "forward link" of the air interface, and communications from an access terminal to a base station are carried on a "reverse link" of the air interface. For IS-2000, data sent on both the forward and reverse links are first assembled into units called frames, which are then encoded for transmission to or from the access terminal at regular intervals (corresponding to a frame rate), typically 20 milliseconds in duration (although other frame intervals can be used). For IS-856, transmission in frames is employed only on the reverse link to the base station. As a result of imperfect transmission, some frames received by the AT on the forward link (under IS-2000, for example) or by the base station on the reverse link (under IS-2000 and/or IS-856, for instance) may contain errors. Other frames—ideally, the majority of them—will be received without errors. It may also be possible through one or another coding technique to correct certain errors in frames.

On either link under IS-2000, or on the reverse link under IS-856, the receiving entity (e.g., AT or base station) can compute a ratio of (i) the number of error-containing frames received during a given period of time to (ii) the total number of frames received during the same period of time. Note that the number of error-containing frames may include lost frames, inferred by the failure to receive a frame during one or more of the regular frame-rate intervals, for example. This ratio, computed by the AT on the forward link and by the base station on the reverse link, is called the frame error rate (FER). More specifically, the frame error rate on the forward link is referred to as the forward-link FER or FFER; the frame error on the reverse link is referred to as the reverse-link FER or RFER. The FER is an indicator of the RF conditions of the forward and/or reverse link, and consequently the quality service provided over the respective link. For instance, frame errors may manifest as lost audio samples, which in turn cause choppy or distorted audio output when played out by a receiving device. Similarly, frame errors may represent packet-data loss that results in retransmissions and lower overall throughput. In general, the higher the FER, the lower the quality of service will be, and vice versa.

For a given set of physical conditions underlying communications between a base station and an access terminal, the higher the transmission power on the link (forward or reverse), the lower the FER will be. Consequently, the quality of service provided on a link can be adjusted and/or controlled by adjusting the transmission power used on the link. Because similar principles apply to both the forward and reverse links, only the forward link is considered in the remainder of the present disclosure.

In practice, on the forward link, an AT will periodically compute its FFER and compare the result with a forward-link "target" FER (TFER) specified by the wireless communication system. If the computed FFER is higher than the forward-link TFER (or higher by a threshold amount), then the AT will invoke power control steps that will cause the base station to increase the power on the forward link. If, instead, the computed FFER is lower than the forward-link TFER (or lower by a threshold amount), then the AT will invoke power control steps that will cause the base station to decrease the power on the forward link. Alternatively, the AT may report its FFER to the base station, which may itself compare the reported value with the target value and increase or decrease the forward-link power in accordance with the comparison. In either case, the goal of power control is to maintain the FFER measured by the AT at a level that hovers about the forward-link TFER.

Correspondingly, the quality of service of the AT's forward link may be kept within a range associated with the forward-link TFER.

While an AT may indicate a need for increased power to base station, power control protocols and methods of wireless communication systems typically implement one or more limits to how high forward-link transmission power may be set. Such limits are used to help manage the overall power budget as well as to balance the forward-link power needs of any given AT in a sector against excessive interference with the forward links of other ATs operating in the same or nearby sectors. Thus, if an AT needs and requests additional forward-link power when it is already receiving its maximum allowed forward-link power, the base station will not honor the request. Consequently, the AT may not always receive a service quality commensurate with its forward-link TFER.

At the same time, there may be one or more ATs operating in the same sector that are each receiving forward-link power at a level that exceeds their needs for maintaining their respective forward-link FERs near their respective forward-link TFERs. According to power control protocols and methods, each such AT may request that their respective forward-link power from the base station be decreased. However, power control protocols and methods of wireless communication systems typically also implement one or more limits to how low forward-link transmission power may be set. If an AT that is already receiving forward-link power at the lower limit requests a further decrease in forward-link power, the base station will not honor the request. Although supplying one or more ATs with forward-link power in excess of what they require to maintain acceptable FFERs does not adversely affect the their service quality, it does potentially represent available forward-link power that could be redistributed among ATs in a given coverage are in a more efficient manner.

In accordance with embodiments of the present invention, a wireless service provider may determine that one or more ATs that are already receiving forward-link power at a maximum allowed level require additional forward-link power in order to attain a required or desired service quality. The wireless service provider may also determine that, in the same coverage area, one or more other ATs are receiving forward-link power in excess of what they require in order to maintain a required or desired service quality. The wireless service provider may then advantageously redistribute some portion of the excess forward-link power to the one or more ATs that need additional forward-link power by increasing their maximum allowed level in order to accommodate delivery of the redistributed power to these ATs.

Hence in one respect, various embodiments of the present invention provide, in a wireless communication system that provides service to access terminals, a method of setting a forward-link transmission power level for at least one access terminal, wherein the method comprises: determining that a given access terminal is requesting a forward-link transmission power level that exceeds a first threshold power level; determining that a number of other access terminals have each requested a respective decrease in forward-link transmission power level by an amount at least as large as a respective threshold amount, the determined number being at least one; increasing the forward-link transmission power level to the given access terminal by an incremental amount; and decreasing the forward-link transmission power level to each of the number of other access terminals by a respective decremental amount, wherein the sum of all the respective decremental amounts equals at least the incremental amount.

In another respect, various embodiments of the present invention provide, in a wireless communication system including a radio access network (RAN) that provides service to access terminals, a method of setting a forward-link transmission power level for at least one access terminal, wherein the method comprises: at the RAN, receiving a request from a given access terminal for a forward-link transmission power level that exceeds a threshold level; at the RAN, receiving from each of a number of other access terminals a request for a respective decrease in forward-link transmission power level by an amount at least as large as a respective threshold amount, the number being at least one; at the RAN, increasing the forward-link transmission power level to the given access terminal by an incremental amount; and at the RAN, decreasing the forward-link transmission power level to each of the number of other access terminals by a respective decremental amount, wherein the sum of all the respective decremental amounts equals at least the incremental amount.

In yet another respect, various embodiments of the present invention provide, in a wireless communication system for providing service to access terminals, the wireless communication system comprising a radio access network (RAN) that includes at least one of (i) a base station, (ii) a radio node controller, (iii) a mobile switching center, and (iv) a home location register, an improvement, wherein the improvement comprises: means for determining that a given access terminal is requesting a forward-link transmission power level that exceeds a threshold level; means for determining that a number of other access terminals have each requested a respective decrease in forward-link transmission power level by an amount at least as large as a respective threshold amount, wherein the determined number is at least one; means for increasing the forward-link transmission power level to the given access terminal by an incremental amount; and means for decreasing the forward-link transmission power level to each of the number of other access terminals by a respective decremental amount, wherein the sum of all the respective decremental amounts equals at least the incremental amount.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

DETAILED DESCRIPTION

Figure 1:
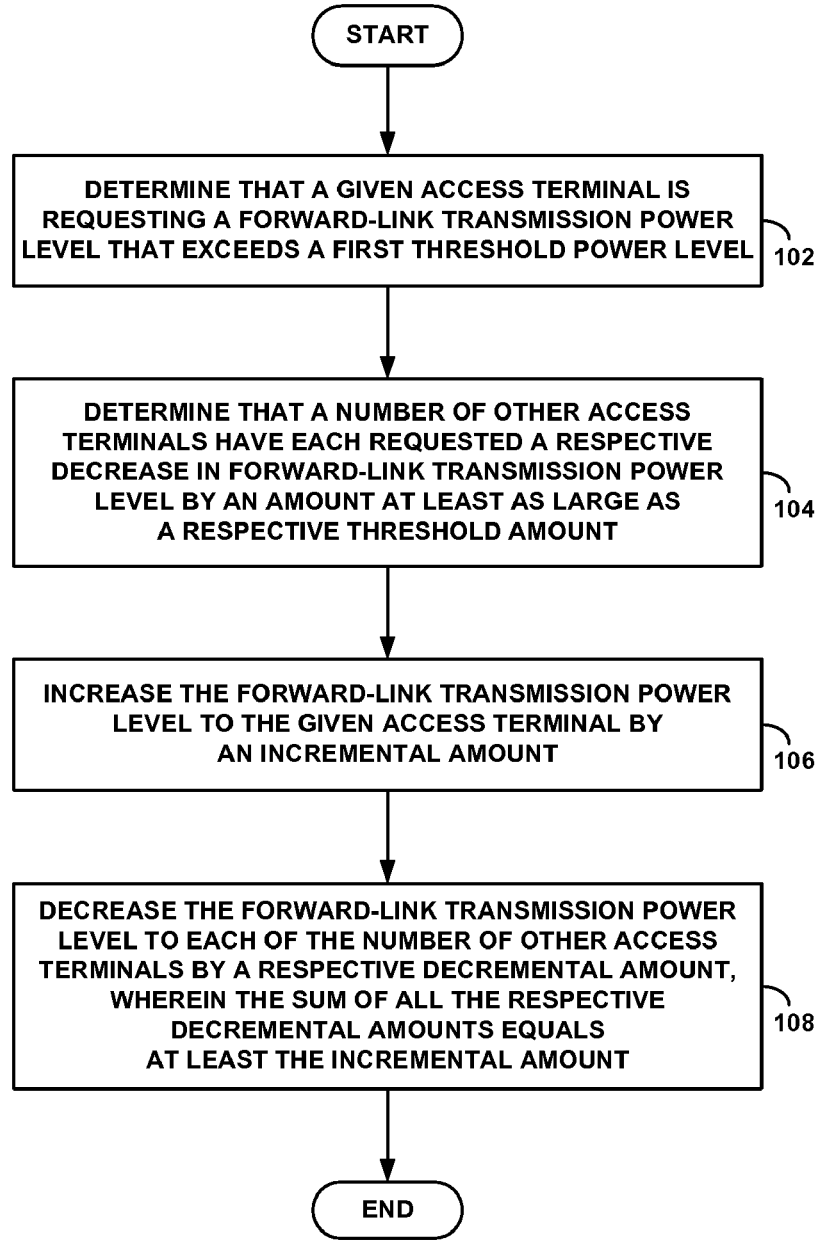
FIG. 1 is a flowchart illustrating an exemplary embodiment of a method of redistribution of forward-link power among access terminals operating in a coverage area.

FIG. 1 is a flowchart illustrating an exemplary embodiment of adjustment of forward-link power levels. By way of example, the steps of the flowchart could be implemented in a wireless communication system that operates according to a CDMA family of protocols, and could be carried out on a per-sector basis. At step 102, a determination is made that a given access terminal is requesting a forward-link transmission power level that exceeds a first threshold power level. For instance, the given access terminal may have sent a request to the base station for a differential increase in forward-link power that when added to the AT's current forward-link power yields a value that exceeds the first threshold power level. Alternatively, as described in more detail below, the given access terminal may have sent at least a first threshold number of consecutive power-increment requests to its serving base station during a first time interval, within which the given access terminal was already receiving forward-link power at a maximum allowed forward-link power level. For example, under IS-2000 (or other CDMA protocols), described below, a power-increment request could correspond a power-up command and the maximum allowed forward-link power level (i.e., the first threshold power level) could correspond to a "MaxGain" parameter set by the system. Further, the first time interval could correspond to an integer multiple of frames, and the first threshold number could be five, for example, although other values of the first threshold number are possible as well.

Note that the amount of time required to send the at least first threshold number of consecutive power-increment requests could be shorter in duration than the first time interval (in which they were sent). In accordance with step 102, the given access terminal will have been receiving forward-link power at the maximum allowed forward-link power level during at least the time required to send the at least first threshold number of consecutive power-increment requests. It is also possible that the given access terminal could receive forward-link power at the maximum allowed forward-link power level for the entire duration of the first time interval.

In practice, the determination made in step 102 could be made by the AT's serving base station or by some other component of a Radio Access Network (RAN) serving the AT, and could apply to one or more sectors in which the given AT is operating. The determination itself could indicate that the AT is currently operating under poor or suboptimal RF conditions, since even at the maximum allowed forward-link power level, the AT is evidently continuing to request more forward-link power. Basing the determination, at least in part, on the given AT sending at least the first threshold number of consecutive power-up commands within the first time interval can help distinguish between short or transient episodes experienced by the given AT of suboptimal RF conditions, which may be acceptable or tolerable, and longer or persistent ones, which are not.

At step 104, a determination is made that a number other access terminals have each requested a respective decrease in forward-link transmission power level by an amount at least as large as a respective threshold amount. For instance, as described in more detail below, each of these other ATs may have sent at least a second threshold number of consecutive power-decrement requests to its serving base station within a second time interval. Thus the second threshold number of consecutive power-decrement requests could represent the respective threshold amount. Further, during the second time interval, one or more of these other ATs may have already been receiving forward-link power at a minimum allowed forward-link power level. For example, under IS-2000 (or other CDMA protocols), a power-decrement request could correspond a power-down command and the minimum allowed forward-link power level could correspond to a "MinGain" parameter set by the system. In this case, the respective threshold amount could be any decremental amount since any power decrement would yield a power level below the minimum allowed level (e.g., MinGain). As with the first time interval, the second time interval could also correspond to an integer multiple of frames, and the second threshold number could be ten, for example, although other values of the second threshold number are possible as well.

As with the power-increment requests, the amount of time required by any one of the other ATs to send the at least second threshold number of consecutive power-decrement requests could be shorter in duration than the second time interval (in which they were sent). Further, the respective sets of consecutive power-decrement requests sent by each of the other ATs may not be strictly contemporaneous with each other within the second time interval (although they could be). Further still, the actual number of consecutive power-decrement requests sent respectively by each of the other ATs could differ among some or all of the other ATs, as long as each of the other ATs sends at least the second threshold number.

Note that the first and second time intervals could be of the same or a different duration, and the first and second threshold numbers could similarly be the same or different. In accordance with the exemplary embodiment, at least a portion of the first time interval overlaps with at least a portion of the second time interval. For example, each could correspond to a common frame transmission time, in which case the two time intervals would be completely and mutually overlapping.

As with step 102, the determination made in step 104 could, in practice, be made by the ATs' serving base station, or by some other component of a RAN serving the AT. Moreover, in making the determination of step 104, the base station (or other network element) may consider only ATs that are operating in the same sector (or sectors) as the given AT (or in the same sector(s) in which the determination of step 102 for the given AT was made). The determination made at step 104 could itself indicate that each of these other ATs is currently operating under good RF conditions. Basing the determination, at least in part, on sending at least the second threshold number of consecutive power-down commands within the second time interval can help distinguish between short or transient episodes experienced by each of these other ATs of good RF conditions, and longer or persistent ones. To the extent that each of these other ATs is receiving more power than it requires to maintain a requisite or desired service quality, each may be considered as receiving "excess forward-link power" (or just "excess power"). The sum total of the excess power received by the number of these other ATs may be characterized as "total excess forward-link power" (or just "total excess power").

At step 106, the forward link power to the given access terminal is increased by an incremental amount. The increase can be achieved by increasing the maximum allowed forward-link power (e.g., MaxGain) for the given AT, for instance. In so doing, subsequent requests by the given AT for additional forward-link power can then be honored by the base station, thereby enabling the AT attain its required or desired level of service. The incremental amount of forward-link power will preferably correspond to some portion (possibly all) of the total excess forward-link power, and will be obtained by appropriating it from some or all of other access terminals determined in step 104. For purposes of the present discussion, each of the number of other access terminals determined in step 104 shall therefore be referred to herein as a "power donor" or a "donor AT," and any plurality of them as "power donors" or "donor ATs."

At step 108, the forward-link power to each of the donor ATs is decreased by a respective decremental amount equal, such that the sum of all the respective decremental amounts equals at least the incremental amount. For any donor AT that is not already operating at the minimum allowed forward-link power level (e.g., MinGain), the decrease may be viewed operationally as accelerating the AT's already-requested reduction in forward-link power (i.e., as determined from the AT's second threshold number of consecutive power decrement requests). For any donor AT that is already operating at the minimum allowed forward-link power level, the power reduction may be achieved by decreasing the minimum allowed forward-link power (e.g., MinGain) of that donor AT. In so doing, subsequent requests by the each such donor AT for reduced forward-link power can then be honored by the base station.

Preferably, the incremental amount of power allocated to the given AT and the respective decremental amounts taken from the donors will have been determined so as to achieve an optimum redistribution of power among the given AT and the donor ATs. For example, the incremental amount could be set, and then a respective decremental amount earmarked from each donor AT (1) according to which donors could most afford to give up power and (2) subject to the sum of the decremental amounts equaling at least the incremental amount. Thus, donor ATs operating at MinGain could be selected first, followed by donor ATs operating at a first level (e.g., 1 dB) above MinGain, a second level (e.g., 2 dB) above MinGain, and so on until the sum of decremental amounts equals at least the incremental amount.

It will be appreciated that the steps of FIG. 1 are exemplary, and that additional and/or alternative steps or alternative ordering of steps could be carried in order to achieve forward-link power adjustment. Additionally, the logical ordering of the steps does not necessarily correspond to a strict temporal ordering. For instance, the steps of increasing forward-link power to the given AT and decreasing forward-link power to the donor ATs could be carried out simultaneously. Further, the determinations of how many power-increment and/or power-decrement requests have been sent by one or another AT could be made in terms of the numbers of such requests received at a base station (or RAN).

Additionally, as presented above, steps 102-108 describe redistribution of some portion of the excess forward-link power of the donor ATs to just one given AT that is determined to be operating under suboptimal RF conditions. In practice, there may be more than one AT operating under similarly poor RF conditions in the same sector (or sectors) as the given AT. That is, there could be more than one AT identified according to the criteria used to identify the given AT. In this case, the method of steps 102-108 may be modified to carry out redistribution of the excess forward-link power among the donor ATs and some or all of the ATs that are identified as operating under suboptimal RF conditions. Adapting the method described above to accommodate a plurality of ATs would involve redistributing the excess power in such a way as to achieve maximum benefit among the plurality of ATs, and at the same time ensure that none of the donor ATs is adversely affected by its decrease in forward-link power. In general, this can be accomplished by optimizing among factors including: how many donor ATs are identified; how much forward-link power each donor can afford to give up without adverse effect; how many ATs are operating under suboptimal RF conditions; and how much additional forward-link power each would need to improve its RF conditions to an acceptable or desirable state.

Figure 2:
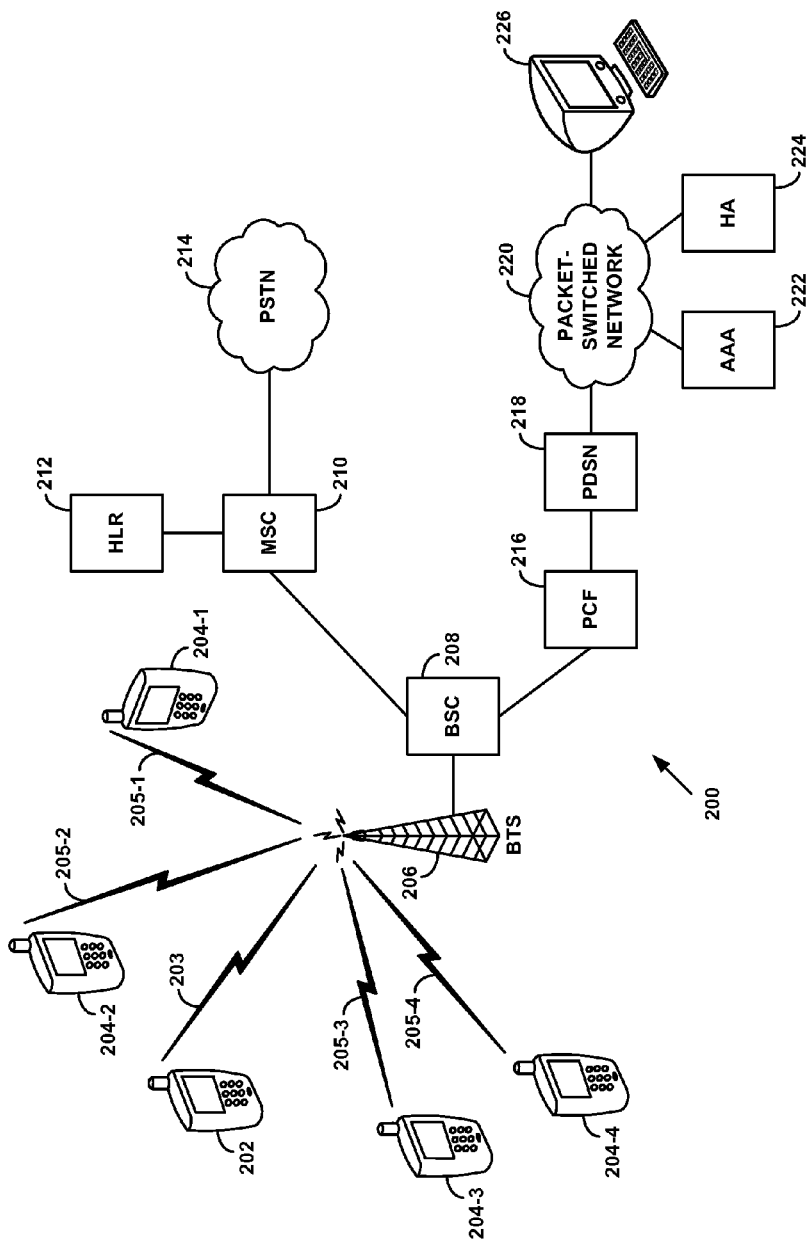
FIG. 2 is a simplified block diagram of a wireless communication system in which an exemplary embodiment of redistribution of forward-link power among access terminals operating in a coverage area can be employed.

FIG. 2 shows a simplified block diagram of a wireless communication system 200 in which an exemplary embodiment of adjustment of forward-link power can be employed. Access terminal AT 202 communicates over an air interface 203 with a BTS 206, which is then coupled or integrated with a BSC 208. Transmissions over air interface 203 from BTS 206 to AT 202 represent the forward link to the access terminal (also referred to herein alternatively as the forward link from the base station, and as "the AT's forward link"). Transmissions over interface 203 from AT 202 to BTS 206 represent the "reverse link" (also referred to herein as "the AT's reverse link"). Four other access terminals, AT 204-1, 204-2, 204-3, and 204-4, are also depicted in FIG. 2. As indicated, they communicate with BTS 206 over air interfaces 205-1, 205-2, 205-3, and 205-4, respectively. Each of these air interfaces is operationally similar to air interface 203, each representing at least a forward and reverse link. In example embodiments discussed below, AT 202 is taken to be a given AT that is determined to be operating under suboptimal RF conditions, while ATs 204-1, 204-2, 204-3, and 204-4 are taken to be donor ATs. It will be appreciated that this arrangement is for purposes of illustration.

BSC 208 is connected to MSC 210, which acts to control assignment of air traffic channels (e.g., over air interfaces 203, 205-1, 205-2, 205-3, and 205-4), and provides access to wireless circuit-switched services such as circuit-voice and circuit-data (e.g., modem-based packet data) service. As represented by its connection to PSTN 214, MSC 210 is also coupled with one or more other MSCs or other telephony circuit switches in the operator's (or in a different operator's) network, thereby supporting user mobility across MSC regions, and local and long-distance landline telephone services. Also connected to MSC 210 is home location register (HLR) 212, which supports mobility-related aspects of subscriber services, including dynamic tracking of subscriber registration location and verification of service privileges.

As shown, BSC 208 is also connected with a PDSN 218 by way of packet control function (PCF) 216. PDSN 218 in turn provides connectivity with a packet-switched network 220, such as the Internet and/or a wireless carrier's private core packet-network. Sitting as nodes on network 220 are, by way of example, an authentication, authorization, and accounting (AAA) server 222, a mobile-IP home agent (HA) 224, and a remote computer 226. After acquiring an air traffic channel over its air interface, an access terminal (e.g., AT 202) may send a request to PDSN 218 for a connection in the packet data network. Then, following authentication of the access terminal by AAA server 220, the access terminal may be assigned an IP address by the PDSN or by HA 224, and may thereafter engage in packet-data communications with entities such as remote computer 226.

It should be understood that the depiction of just one of each network element in FIG. 2 is illustrative, and there could be more than one of any of them, as well as other types of elements not shown. The particular arrangement shown in FIG. 2 should not be viewed as limiting with respect to the present invention. Further, the network components that make up a wireless communication system such as system 200 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network, and operable to transmit and receive the communications and messages described herein, and one or more computer software programs and related data (e.g., machine-language instructions and program and user data) stored in the one or more forms of computer-readable storage and executable by the one or more computer processors to carry out the functions, steps, and procedures of the various embodiments of the present invention described herein. Similarly, a communication device such as exemplary access terminals 202, 204-1, 204-2, 204-3, and 204-4 typically comprises a user-interface, I/O components, a communication interface, a tone detector, a processing unit, and data storage, all of which may be coupled together by a system bus or other mechanism. As such, system 200, ATs 202, 204-1, 204-2, 204-3, and 204-4, and air interfaces 203, 205-1, 205-2, 205-3, and 205-4 collectively are representative of exemplary means of implementing and carrying out the various functions, steps, and procedures described herein.

Throughout this description, the term "base station" will be used to refer to a Radio Access Network (RAN) element such as a BTS, a BSC, or combination BTS/BSC, for instance. The term "radio network controller" (RNC) can also be used to refer to a BSC, or more generally to a base station. In some arrangements, two or more RNCs may be grouped together, wherein one of them carries out certain control functions of the group, such as coordinating handoffs across BTSs of the respective RNCs in the group. The term controlling RNC (or C-RNC) customarily applies to the RNC that carries out these (and possibly other) control functions.

1. CDMA COMMUNICATIONS

The present invention will be described by way of example with reference to Code Division Multiple Access ("CDMA") communications in general, and to IS-2000 communications in particular. However, it should be understood that the invention can apply to other wireless voice and data protocols including, without limitation, IS-95, IS-856, and GSM, all of which are considered herein to comprise a CDMA family of protocols.

In a conventional CDMA wireless network compliant with the well known IS-2000 standard, each cell employs one or more carrier frequencies, typically 1.25 MHz in bandwidth each, and each wireless service sector is distinguished from adjacent sectors by a pseudo-random number offset ("PN offset"). Further, each sector can concurrently communicate on multiple different channels, distinguished from each other by "Walsh codes." When an access terminal operates in a given sector, communications between the access terminal and the BTS of the sector are carried on a given frequency and are encoded by the sector's PN offset and a given Walsh code.

Air interface communications are divided into forward link communications, which are those passing from the base station to the access terminal, and reverse link communications, which are those passing from the access terminal to the base station. In an IS-2000 system, both the forward link and reverse link communications in a given wireless service sector are encoded by the sector's PN offset and a given Walsh code. On the forward link, certain Walsh codes are reserved for use to define control channels, including a pilot channel, a sync channel, and one or more paging channels, and the remainder can be assigned dynamically for use as traffic channels, i.e., to carry user communications. Similarly, on the reverse link, one or more Walsh codes may be reserved for use to define access channels, and the remainder can be assigned dynamically for use as traffic channels.

In order to support concurrent communication in multiple channels on a common frequency, each channel is allocated a fraction of the total forward-link power available in the sector. The power allocated to each channel is determined so as to optimize the signal to noise characteristics of all the channels, and may vary with time according to the number of access terminals being serviced, and their relative positions with respect to the BTS, among other factors. Similarly, on the reverse links, each access terminal transmits at a power level that optimizes the signal to noise while minimizing interference with other access terminals.

In practice, similar methods of power control are implemented on both the forward and reverse links. For each link, two interrelated schemes are employed. The first, called "inner-loop" power control, achieves rapid convergence of link power to a level corresponding to a threshold signal-to-noise ratio (SNR). The second, called "outer-loop" power control, operates on a much longer time scale (i.e., more slowly) than the inner loop, and adjusts the inner-loop threshold SNR in response to the computed FER. Thus the outer loop adjusts the SNR threshold to attain a desired quality of service (as measured by FER), while the inner loop adjusts the link power to quickly achieve (at least approximately) the SNR threshold set by the outer loop. In accordance with the discussion above, further details of power control will be described with reference only the forward link. However, it should be understood that, except for switching operational roles of an access terminal and a base station (i.e., roles with respect to sending and responding to power-control commands described below), the basic principles apply to the reverse link as well.

More specifically, for inner-loop power control, the access terminal measures SNR at a rate of 800 times per second (although other rates are possible), each SNR measurement being made in terms of $E_b/N_0$, where $E_b$ is the energy per bit of the signal received by the AT and the $N_0$ is the noise power spectral density. For each measurement, the AT compares $E_b/N_0$ with a threshold value called $(E_b/N_0)_{setpoint}$ and responsively sets and sends a power control bit to the base station in order to affect a power adjustment. For $E_b/N_0 \leq (E_b/N_0)_{setpoint}$, the AT sets the power control bit to "power up," and the base station responsively increases the forward link power by a small amount (typically 1 dB or less). For $E_b/N_0 > (E_b/N_0)_{setpoint}$, the AT sets the power control bit to "power down," and the base station responsively decreases the forward link power by the same small amount. In this manner, the forward link power rapidly converges, in small increments or decrements, to a level where $E_b/N_0 \approx (E_b/N_0)_{setpoint}$, and thereafter hovers about $(E_b/N_0)_{setpoint}$ until a $(E_b/N_0)_{setpoint}$ is adjusted to a new value by outer-loop power control. Each transmission by the AT of the power control bit set to power up is commonly referred to as a "power-up command." Similarly, each transmission of the power control bit set to power down is referred to as a "power-down command."

For outer-loop power control on the forward link, the AT computes FFER in consecutive windows, each being an integer number of frames in duration. Thus, in each window, FFER may be expressed as the number of frames with errors divided by the number of frames per window. Typically, the duration of a window is 20 frames, although other window sizes (number of frames per window) could be used. For each window, the AT compares the computed FFER with a forward-link TFER. If the computed FFER is less than TFER, the access terminal decreases $(E_b/N_0)_{setpoint}$. Conversely, if the computed FFER is greater than TFER, the access terminal increases $(E_b/N_0)_{setpoint}$. In this manner, a computed FFER that exceeds the target FER drives the inner-loop power control to increase the forward-link power, while a computed FFER that is below the target FER drives the inner-loop power control to decrease the forward-link power.

In the context of a CDMA family of protocols, the power control methods described in the preceding are sometime referred to as "inner-loop power-control protocols" and "outer-loop power-control protocols." It should also be noted that additional or alternative methods of power control may be applied to either of the forward or reverse links. For example, in each of successive windows, the access terminal may send to the base station a power measurement report message (PMRM) containing the number of frames with errors, total number of frames, and the FFER. The base station may then compare the reported FFER with the forward-link TFER, and adjust the forward-link power accordingly.

With arrangement described above, an access terminal can engage in cellular voice or packet-data communications. Referring again to FIG. 2, and taking an originating call from AT 202 as an example, AT 202 first sends an origination request over air interface 203 and via the BTS 206 and BSC 208 to MSC 210. The MSC then signals back to the BSC directing the BSC to assign an air interface traffic channel for use by the access terminal. For a voice call, the MSC uses well-known circuit protocols to signal call setup and establish a circuit connection to a destination switch that can then connect the call to a called device (e.g., landline phone or another access terminal). For a packet-data session, the BSC signals to the PDSN 218 by way of PCF 216. The PDSN 218 and access terminal 202 then negotiate to establish a data link layer connection, such as a point to point protocol (PPP) session. Further, the PDSN 218 sends a foreign agent advertisement that includes a challenge value to the access terminal, and the access terminal responds with a mobile-IP registration request (MIP RRQ), including a response to the challenge, which the PDSN forwards to HA 224. The HA then assigns an IP address for the access terminal to use, and the PDSN passes that IP address via the BSC to the access terminal.

2. POWER ADJUSTMENT

In the forward-link power-control schemes described above, a maximum level of forward-link power to each AT is enforced according to an upper limit threshold set in a system parameter designated MaxGain. When a base station (or other element of a RAN) receives a power-up command from an AT, the base station determines whether or not incrementing the AT's current forward-link power level by the amount associated with the power-up command will result in a new power level that exceeds MaxGain. If it will, the base station will not increase the AT's forward-link power level. If it will not, then the base station can increase the AT's forward-link power in response to the power-up command.

Similarly, a minimum level of forward-link power to each AT is enforced according to a lower limit threshold set in a system parameter designated MinGain. When a base station (or other element of a RAN) receives a power-down command from an AT, the base station determines whether or not decrementing the AT's current forward-link power level by the amount associated with the power-down command will result in a new power level that is less than MinGain. If it will, the base station will not decrease the AT's forward-link power level. If it will not, then the base station can decrease the AT's forward-link power in response to the power-down command.

Both MaxGain and MinGain are typically set as system-wide parameters that apply to all ATs operating in the wireless communication system. These parameters can also be set on a less global basis, for instance at the RAN level, BSC level, BTS level, or even sector level. In accordance with embodiments of the present invention, MinGain and MaxGain (or more generally, minimum and maximum allowed forward-link power levels) may also advantageously be set on a per-AT basis to facilitate redistribution of forward-link power among a collection of access terminals operating within a common coverage area.

As described above, it is possible for an AT to bump up against MaxGain (or some other upper limit) while still not achieving its forward-link TFER. In this case, the AT will continue to send power-up commands to its serving base station, but the base station will not accommodate those commands. When this occurs, it may indicate that the AT is operating under poor or suboptimal RF conditions. Also as described above, it is possible for an AT to run into MinGain (or some other lower limit) while receiving more forward-link power than required to attain a FER at a level of its forward-link TFER. In this case, the AT will continue to send power-down commands to its serving base station, but the base station will not accommodate those commands. When this occurs, the AT may be considered as receiving excess forward-link power, in the sense that, even while operating at MinGain, it is receiving more forward-link power than it needs to maintain its FER at a level of its forward-link TFER. Note that even an AT that is operating near, but above, MinGain could be considered as receiving excess forward-link power if that AT has sent some number of consecutive power-down commands.

In accordance with embodiments of the present invention, the base station, RAN, or other network element will recognize when one or more ATs in a sector (or other coverage area) are operating under suboptimal RF conditions, while at the same time one or more other ATs in the same sector (or other coverage area) are operating under good RF conditions and receiving excess forward-link power. When this occurs, the base station will advantageously redistribute forward-link power among the ATs in such a manner as to remedy as much as possible the suboptimal RF conditions while not adversely affecting the RF conditions of the ATs identified as having excess forward-link power. The various aspects of this redistribution are discussed below by way of example.

As described above, a base station can identify a given AT as one that is operating under suboptimal RF conditions (or otherwise in need of additional forward-link power) by determining that the given AT has sent at least a first threshold number of consecutive power-up commands to the base station within a first time interval, during which the given AT was already receiving forward-link power at a level corresponding to MaxGain. By way of example, the first threshold number could be five and the first time interval could correspond to a transmission frame. The base station could track each power-up command from the given AT that is received while the base station is transmitting at MaxGain on a forward link to the given AT, and could keep a running tally of all such commands that are received consecutively. For instance, the tally could be maintained in one or more forms of magnetic or solid-state (or other forms of) memory associated with the base station. If the tally reached five (or some other first threshold number) within a transmission frame (or other first time interval), then the base station would consider the AT to be in need of additional forward-link power. If prior to reaching five, the tally were interrupted by a power-down command, or a power-up (or power-down) command received while forward-link power to the given AT was below MaxGain, then the tally would be cleared (e.g., set to zero). Accumulation in the tally would then resume (starting at one) upon the next power-up command received while the base station was transmitting at MaxGain on a forward link to the given AT.

For typical operating parameters under IS-2000, power-control bits are sent every 1.25 milliseconds (i.e., 800 times per second), while a transmission frame corresponds to 20 milliseconds. Thus, the base station will receive 16 power control bits from the given AT during each frame interval. In accordance with the present example, five consecutive power-up commands under this limited-power condition (i.e., MaxGain) corresponds to at least 6.25 milliseconds within a transmission frame during which the base station was transmitting at MaxGain on the given AT's forward link. As discussed above, it is also possible for transmission at MaxGain to last the entire duration the transmission frame.

As an alternative way of determining that a given AT is operating under suboptimal RF conditions, the base station could keep a running tally in each frame of all power-up commands from the given AT that are received while the base station is transmitting at MaxGain on the given AT's forward link (i.e., not just consecutive power-up commands). If, during a particular frame, the tally reached a first threshold value, for example 10 out of 16 power control bits (or roughly 63% of a transmission frame), then the base station could consider the AT to be in need of additional forward-link power. The tally could be cleared at the start of each new frame. Again, the tally could be maintained in one or more forms of magnetic or solid-state memory associated with the base station.

In a similar manner, the base station can identify a number of other ATs as each operating under favorable RF conditions by determining that each has sent at least a second threshold number of consecutive power-down commands to the base station within a second time interval, during which each of the other ATs was already receiving forward-link power at or near a level corresponding to MinGain. In typical operation, power-up and power-down commands correspond to 1 dB (or similarly small) increments or decrements of an AT's current forward-link power level (current with respect to when the power command is issued). As such, an AT operating "at or near" MinGain may be considered as one operating at MinGain or one or a few (e.g., two to four) dBs above MinGain. Note that dB is a relative measure of power, a 1-dB increment or decrement corresponding to roughly a 25% increase or decrease in absolute power level, and a 3-dB increment or decrement (for instance) corresponding to a factor of two increase or decrease in absolute power level. A typical setting of MinGain might correspond to an absolute power of roughly 57 milliWatts (mW). Thus, an AT operating at (say) even 3 dB above MinGain is operating at a fairly low power level, since twice MinGain corresponds to a still small absolute power level. If such an AT, already at a low power level, has sent at least a second threshold number of consecutive power-down, its operating conditions may reasonably be deemed favorable.

By way of example, the second threshold number could be seven and the second time interval could again correspond to a transmission frame. The base station could track each power-down command from each particular AT that is received while the base station is transmitting at or near MinGain on a forward link to the particular AT, and could keep a running tally of all such commands from the particular AT that are received consecutively. If the tally reached seven (or some other second threshold number) within a transmission frame (or other second time interval), then the base station would consider the particular AT to be receiving excess forward-link power (excess forward-link power in the sense described above). If prior to reaching seven, the tally were interrupted by a power-up command, then the tally for the particular AT would be cleared (e.g., set to zero). Accumulation of the tally for the particular AT would resume (starting at one) upon the next power-down command received while the base station was transmitting at or near MaxGain on a forward link to the particular AT. Each of the ATs for which the tally did reach at least seven (or some other second threshold number) would be considered one of the number of other ATs (the number being the total number of all such ATs).

As an alternative way of determining that a number other ATs is each operating under favorable RF conditions, the base station could, for each particular AT, keep a running tally in each frame of all power-down commands from the particular AT that are received while the base station is transmitting at or near MinGain on the particular AT's forward link (i.e., not just consecutive power-down commands). If, during a particular frame, the tally for the particular AT reached a second threshold value, for example 12 out of 16 power control bits (or roughly 75% of a transmission frame), then the base station could consider the particular AT to be receiving excess forward-link power. Each of the ATs for which the tally reached at least 12 (or some other second threshold number) would be considered one of the number of other ATs (the number being the total number of all such ATs). The tallies could be cleared at the start of each new frame.

When a base station (or other network element) determines according to the one of the methods above that a given AT is in need of additional forward-link power and that a number of other ATs are each receiving excess forward-link power, the base station can then redistribute forward-link power among all the ATs. The purpose is to improve the quality of the given AT's forward link while maintaining the quality of the other ATs' forward links Redistribution of forward-link power is applied to ATs which receive their forward-link power from a common power budget. In practice, this corresponds to ATs with active forward links in the same coverage area. As discussed above, a coverage area could be a cell or a sector, for example, although other arrangements are possible as well.

3. EXAMPLE EMBODIMENT

An example embodiment of dynamic redistribution of forward-link power among access terminals is described below. In keeping with the terminology introduced earlier herein, each of the number of other ATs is referred to as a donor AT, and they are referred to collectively as donor ATs. As discussed above, this terminology is descriptive of each of the number of other ATs as having been identified as receiving excess forward-link power, and of the redistribution that reallocates some portion of their forward-link power to the given AT's forward link.

In accordance with the example embodiment, the base station will increase the MaxGain value for the given AT by an incremental amount. Once the increased value of MaxGain for the given AT is set, the base station can respond to additional power-up commands from the given AT by increasing the power on the AT's forward link. At the same time, the base station will correspondingly reduce the forward-link power to each of the donor ATs by a respective decremental amount such that the total of all the respective decremental amounts equals at least the incremental amount. The power reductions can be achieved either by directly reducing forward-link power to those donor ATs operating near (but above) MinGain, or by decreasing the MinGain setting for those donor AT's already operating at the current MinGain value. By taking power from donors near MinGain, the base station effectively accelerates its response to their already known requests for power reductions (i.e., their consecutive power-down commands). By reducing the setting of MinGain for those ATs operating at MinGain, the base station can respond to additional power-down commands from these donor ATs by decreasing the power on each of their respective forward links. In either case, the forward link of each donor AT will be reduced by a respective amount of power. The combined actions by the serving base station of (1) increasing MaxGain for the given AT, (2) thereafter increasing forward-link power to the given AT in response to additional power-up commands from the given AT, and (3) decreasing forward-link power to the donor ATs, are representative of the basic method of power redistribution.

Figure 3:
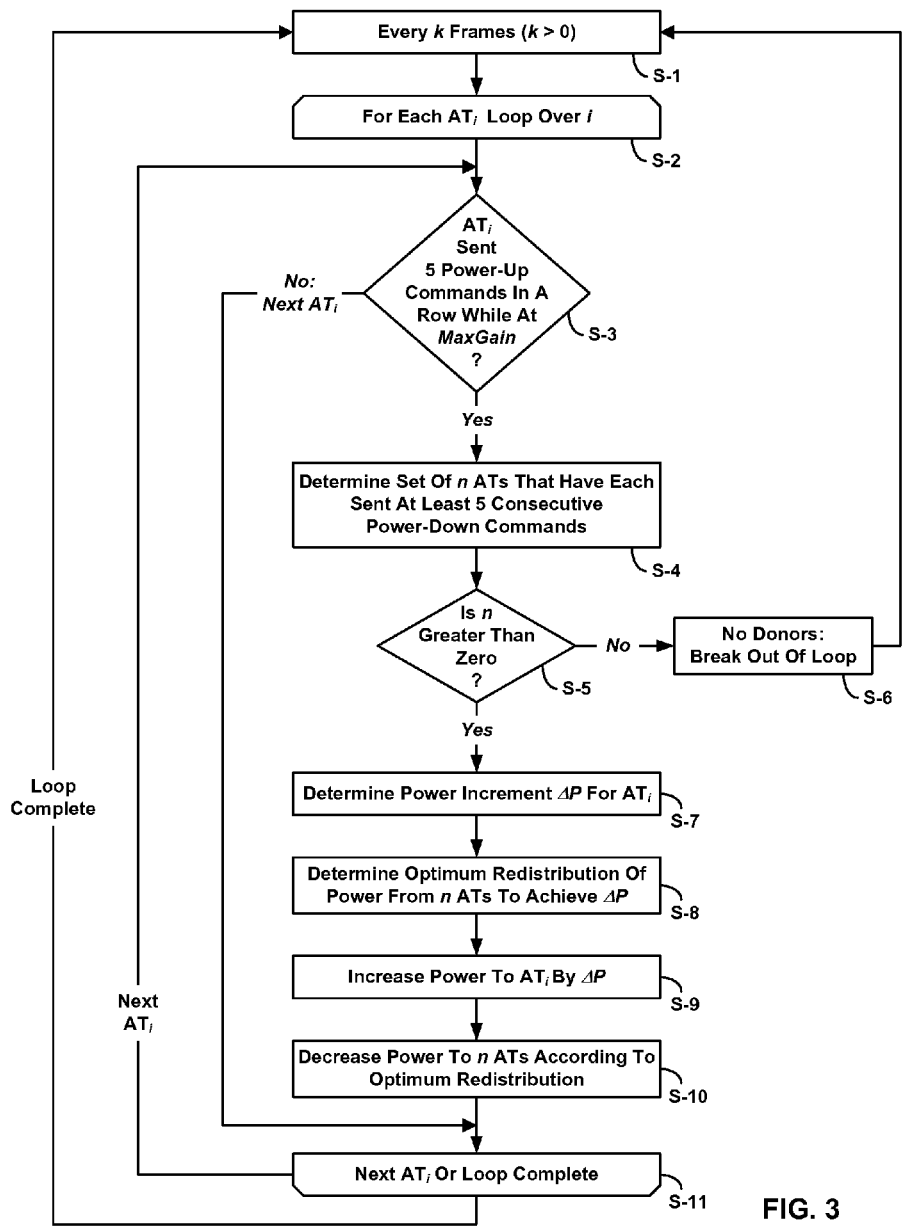
FIG. 3 illustrates an example of logical operation of redistribution of forward-link power among access terminals operating in a coverage area.

FIG. 3 illustrates the example embodiment in terms of its logical operation, depicted in a flowchart. Step S-1 marks the start of a common time interval of k frames (k>0) that, in the present embodiment, corresponds to both the first and second time intervals described above. Within the common time interval, access terminals are identified that, according to criteria described above, are operating under suboptimal RF conditions. This identification process and the actions intended to remedy the AT's suboptimal RF conditions are illustrated by a logical "loop" over ATs, as indicated by loop-terminations at step S-2 (top of loop) and step S-11 (bottom of loop), and by the designation of index "i" to reference individual access terminals within the context of the loop (i.e., "$AT_i$" in the figure).

At step S-3, a determination is made as to whether or not $AT_i$ has sent at least five consecutive power-up commands while receiving forward-link power at a level corresponding to MaxGain (i.e., the criteria for suboptimal RF conditions). Thus, in this example embodiment, the first threshold number is five. If the criteria are not met, the determination process moves to another AT (i.e., the next "$AT_i$"), as indicate by the arrow labeled "No: Next $AT_i$". If $AT_i$ does meet the criteria for suboptimal RF conditions, then a search for potential donor ATs (if any) is made, as indicated at step S-4.

Specifically, at step S-4, a determination is made as to whether any ATs operating at or near MinGain on their forward links have sent at least five consecutive power-down commands, the number of ATs so determined being n. Thus, in this example embodiment, the second threshold number is also five, and the set of n ATs represents donor (or possible donor) ATs. The outcome of the determination is tested at step S-5, wherein if the n is zero, there are no potential donors, and no attempt at redistribution can take place until at least the next time interval (k frames). This is indicated at step S-6, where the lack of donors forces the loop over ATs to be terminated without considering any further ATs.

If n is greater that zero, then forward-link power redistribution proceeds from step S-7 for the current $AT_i$ and the n donor ATs. At step S-7, a power increment, designated "$\Delta P$," is determined for $AT_i$. For example, the increment could be taken to be 0.5 dB above MaxGain, which would correspond to an increase of about 12% in forward-link power; i.e., an increase by a relative amount. Depending on the absolute forward-link power (e.g., in Watts), this increase would then correspond to an absolute power increase. Other values for the incremental amount could be used, and could be specified directly as an absolute amount of power instead of a relative amount.

At step S-8, an optimum redistribution of forward-link power from the n donor ATs is determined such that the total contribution is at least equal to $\Delta P$ in absolute terms, while resulting in a minimum impact on the quality of the forward links of each of the n donors. An example of such an optimum redistribution is one that takes power from the forward links of donors in a priority order, according to those that can best afford to operate with reduced forward-link power. Specifically, donors operating at MinGain could first be targeted, followed by donors operating at successively tiered levels above MinGain. In practice, forward-link power levels are arranged in successive 1 dB (or similarly small) increments above MinGain, corresponding to relative power increments of roughly 25% from one level to the next, as noted above. Starting at MinGain and progressing up each successive level, a tally of the absolute power obtained from a 1-dB reduction of the donor ATs operating at that level would be computed. Once the tally reached at least $\Delta P$ (in absolute terms), the optimum redistribution would be considered as having been determined.

Note that depending on the absolute sizes of $\Delta P$ and MinGain, and on how many donors are operating at MinGain and each level above, the tally could achieve at least $\Delta P$ with fewer than the n total donors identified at step S-4. In this case, any of the n donors whose contributions to the tally are not needed would not have their forward-link power reduced. Further, since donor ATs that do contribute to the tally may be operating at different power levels with respect to MinGain, the 1-dB relative reduction that each will see will not necessarily correspond to a single, common value of absolute forward-link power. Thus, in the sense that some donor ATs may give up no power and those that do may give up varying amounts, the optimum redistribution corresponds to a respective power decrement at each donor AT.

At step S-9, the forward-link power to $AT_i$ is increased by $\Delta P$. As described above, this may be achieved by resetting MaxGain for $AT_i$ to $\Delta P$ above its current level. Typically, MaxGain is maintained as a system-wide parameter known to each base station. Resetting MaxGain for $AT_i$ could be done by the $AT_i$'s serving base station, for example. The serving base station could, for instance, keep track of a distinct MaxGain setting for each access terminal that it is actively serving (i.e., with an active forward link), storing AT-specific MaxGain settings in some form of media storage (e.g., magnetic disk, solid-state memory, etc). The base station could then apply the AT-specific settings in its power-control procedures for each AT. Note that the modified setting would apply only to $AT_i$ (or any other ATs similarly subject to remedial forward-link power increments above the default MaxGain value). Then, on the next one or more power-up commands from $AT_i$, the base station would honor the request(s) by increasing $AT_i$'s forward-link power by as much as $\Delta P$.

Corresponding to the increase in power to $AT_i$, each of the n donors would have its respective forward-link power reduced according to the optimum redistribution, as indicated at step S-10. Operationally, the serving base station would reduce the forward-link power to each donor AT by a respective decremental amount. As noted, the respective decremental amounts could be different for some or all of the donor ATs, including some donors for which there is no reduction at all. For those donors that are operating at MinGain, forward-link power reduction would be achieved by resetting their MinGain values to a level reduced by their respective decremental amounts. As with increasing MaxGain, reducing MinGain could be done at the serving base station by modifying MinGain on a per-AT basis, again storing the per-AT settings in some form of media storage or computer memory, for example. Subsequent power-down commands from these donor ATs could then be honored by the serving base station. Those donors operating at one or more tiers above MinGain could have their forward-link power levels directly reduced by the serving base station by their respective decremental amounts; i.e., reductions could be carried out prior to receiving additional power-down commands, for instance.

Once power redistribution is accomplished for $AT_i$, the process continues searching for other ATs, if any, that may meet the criteria for operation under suboptimal RF conditions, and then applying again the power redistribution steps. This is indicated by step S-11, which terminates the loop started at set S-2. Specifically, if there are more ATs to check, the process returns to step S-3. If not, then process is finished for the current common time interval, and thus returns to step S-1 until the next time interval (k frames), as indicated by the arrow labeled "Loop Complete".

It will be appreciated that the steps depicted in FIG. 3 illustrate just one example of how power redistribution can be carried out. Moreover, while certain strict rules of usage may be viewed as inherent to the programming construct of a logical loop, the loop in FIG. 3 should be seen more in symbolic terms as representing a process that is carried out for one or more ATs, though not necessarily according to the exact serial order implied by a loop. In particular, it could be advantageous for a base station to first identity all ATs it is serving that at any common, given time happen to be operating under suboptimal RF conditions, and then apply power redistribution to them in some form of priority order. For instance, the base station could prioritize based on the actual number of consecutive power-up commands sent by an AT operating at MaxGain, or how long an AT has been operating under suboptimal RF conditions, or a combination of both or other factors. Additionally, the determination of the incremental amount of forward-link power for each AT operating under suboptimal RF conditions could be based on how many such ATs are identified, together with how many donor ATs are identified and the total amount of forward-link power that they collectively can contribute towards the overall redistribution.

While the example embodiment described above is directed to reallocating power from donor ATs to help remedy one or more given ATs that require additional forward-link power, it should be understood that the particular circumstances that lead to suboptimal RF operating conditions for a given AT, as well as those that make it possible for each of the donor ATs to enjoy receiving more forward-link power than they need, are generally transient. For instance, the given AT may be located in a moving vehicle that temporarily travels near the outer reaches of a sector where the BTS's signal is relatively weak. Similarly, each of the donor ATs may be operating in the same sector but close by the same BTS, where the signal is much stronger. At some later time, the given AT may move sufficiently closer to the BTS that it no longer needs extra forward-link power. And similarly, one or more of the donor ATs may at some later time move to locations where they are no longer receiving excess power (in the sense described above).

Thus, while the various embodiments described herein address how power is redistributed from donor ATs to the given AT, it is anticipated that the redistribution is temporary, and that at some later point in time when RF conditions improve, the given AT may adapt to a lower forward-link power level (e.g., by way of power-down commands), and may no longer require an elevated value of MaxGain. At that time the MaxGain setting for the given AT could be reset to a system-wide default value, for example. Also at some subsequent time, one or more of the donor ATs may require sufficient additional forward-link power so as to remove them from consideration as donors. In other words, the method and system exemplified by the embodiments described herein address forward-link power needs of access terminals in a manner that dynamically and advantageously modifies or readjusts the customary power-control regimes typically in place in a wireless communication system.

4. EXEMPLARY OPERATION

Figure 4:
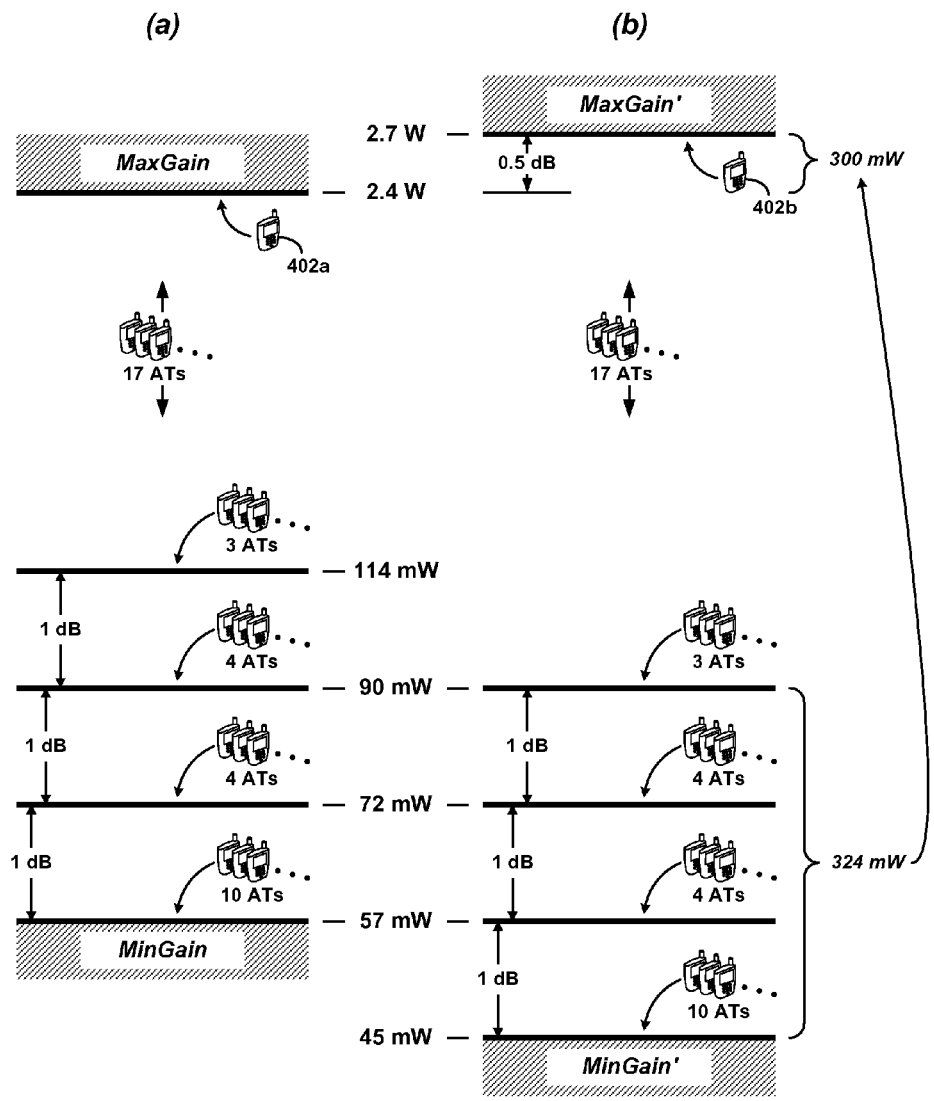
FIG. 4 illustrates an example of operation of an embodiment of redistribution of forward-link power among access terminals operating in a coverage area.

An example of operation of power redistribution in accordance with the embodiment described above is illustrated in FIG. 4, which shows a power level diagram of the forward-link power distribution among a plurality of ATs with active forward links in the same coverage area (sector or cell), before and after power redistribution. In the initial configuration (FIG. 4a), MinGain is set to a level corresponding to an absolute forward-link power of 57 mW, while MaxGain is set to a level corresponding to an absolute forward-link power of 2.4 W. A single given AT 402a is shown to be operating at MaxGain (curved arrow pointing from AT 402a to the MaxGain upper limit). In addition, four groupings of ATs are shown as operating at various forward-link power levels between MinGain and MaxGain. Each grouping is graphically represented by a cluster of three ATs and diagonal line of ellipses. The graphical depiction of three ATs in each cluster is intended to signify one or more ATs, but not necessarily the specific number of three. Rather, a label under each cluster specifies the number of ATs in each grouping (e.g., "10 ATs", "4 ATs", etc.). A curved arrow points from each cluster to the power level of the forward links of the ATs in the cluster.

As indicated in FIG. 4a, there are 10 ATs operating at MinGain, four at 1 dB above MinGain (i.e., at 72 mW), four at 2 dB above MinGain (i.e., at 90 mW), and three at 3 dB above MinGain (i.e., at 114 mW). For the purposes of the present illustration, it may be assumed that these 21 total ATs meet the criteria for donors. Thus, n=21. Also shown are 17 ATs operating at one or more unspecified levels between 114 mW and MaxGain (i.e., at 2.4 W). In addition, there could be other ATs (not shown) at one or more of the donors' power levels that do not meet the donor criteria. Note that the absolute power levels specified in parentheses are rounded to the nearest milliWatt.

FIG. 4b shows the redistribution of power from the n=21 donor ATs to the given AT, which is now relabeled as 402b. The power increment to AT 402b is 0.5 dB, corresponding to 300 mW and yielding a new value of MaxGain that corresponds to an absolute power level of 2.7 W. As indicated, a total of 324 mW can be obtained from the 21 donor ATs (24 mW more than is strictly needed). This represents an optimum redistribution, and can be determined by the serving base station of the coverage area or by some other element of the RAN as follows.

First, the 10 ATs operating at MinGain are considered. Reducing the forward-link power to each of these 10 ATs by 1 dB places them at a new absolute power level of 45 mW and yields a per-AT contribution of 12 mW, for a total of 120 mW. Since this is insufficient to cover the incremental amount of 300 mW, the four ATs operating at 72 mW are next considered. Reducing the forward-link power to each of these four ATs by 1 dB places them at a new absolute power level of 57 mW and yields a per-AT contribution of 15 mW, for a total of an additional 60 mW and a new tally of 180 mW. Still insufficient, the four ATs operating at 90 mW are next considered. Reducing the forward-link power to each of these four ATs by 1 dB places them at a new absolute power level of 72 mW and yields a per-AT contribution of 18 mW, for a total of an additional 72 mW and a new tally of 252 mW. Finally, the three ATs operating at 114 mW are considered. Reducing the forward-link power to each of these three ATs by 1 dB places them at a new absolute power level of 90 mW and yields a per-AT contribution of 24 mW, for a total of an additional 72 mW and a final tally of 324 mW. Thus the 300 mW incremental amount for AT 402b is achieved by reallocation of forward-link power from the 21 donor ATs. Note that 300 mW could evidently be obtained with only two of the three donor ATs initially operating at 114 mW. However, since the values used in this example are rounded, the margin offered by contribution from all three of these ATs may actually be necessary.

In practice, there could be additional ATs (not shown) operating at 4 dB (and even 5 dB) above MaxGain and meeting the donor criteria in terms of consecutive power-down commands. In this case, they would not contribute power to the forward link of AT 402b since the increased power needs are evidently met by the 21 donor ATs as described above. However, since there could also be additional ATs that, like AT 402a, are operating under suboptimal RF conditions, the availability of additional donor ATs could make alleviation of the conditions through power redistribution possible for one or more of these additional ATs.

As described in connection with FIG. 3 above, increasing the power on the forward link of AT 402b can be achieved by resetting MaxGain for the AT to a level corresponding to 2.7 W, thus enabling the serving base station to respond to power-up commands from AT 402b. Similarly, decreasing the power on the forward links to the 10 donor ATs operating at MinGain can be achieved by resetting MinGain for these 10 AT to a level corresponding to 45 mW, thus enabling the serving base station to respond to power-down commands from these ATs. For the other 11 donor ATs, the serving base station can directly reduce the power on each of their forward links by 1 dB, also as described above. Thus, FIG. 4b represents the forward link power configuration of AT 402b and the 21 donor ATs after redistribution. The 17 additional ATs are not part of the power redistribution, but may need to be considered by the serving base station since they account for part of the total forward-link power budget.

5. CONCLUSION

An exemplary embodiment of the present invention has been described above. Those skilled in the art will understand, however, that changes and modifications may be made to this embodiment without departing from the true scope and spirit of the invention, which is defined by the claims.

We claim:

1. In a wireless communication system that provides service to access terminals, a method of setting a forward-link transmission power level for at least one access terminal, the method comprising:

determining that a given access terminal is requesting a forward-link transmission power level that exceeds a first threshold power level, wherein determining that the given access terminal is requesting a forward-link transmission power level that exceeds the first threshold power level comprises (i) receiving a request from the given access terminal for a differential increase in forward-link transmission power, and (ii) determining that a sum of the differential increase and a current forward-link transmission power to the given access terminal exceeds the first threshold power level, the current forward-link transmission power to the given access terminal being a forward-link transmission power to the given access terminal when the request is received;

determining that a number of other access terminals have each requested a respective decrease in forward-link transmission power level by an amount at least as large as a respective threshold amount, the determined number being at least one;

increasing the forward-link transmission power level to the given access terminal by an incremental amount; and decreasing the forward-link transmission power level to each of the number of other access terminals by a respective decremental amount, wherein the sum of all the respective decremental amounts equals at least the incremental amount.

2. The method of claim 1, wherein the wireless communication system comprises a radio access network (RAN), and wherein determining that the given access terminal is requesting a forward-link transmission power level that exceeds the first threshold power level further comprises:

determining that the given access terminal has sent to the RAN at least a first threshold number of consecutive power-increment requests during a first time interval in which the given access terminal was receiving forward-link transmission power at a maximum allowed forward-link power level for the given access terminal.

3. The method of claim 2, wherein determining that the number of other access terminals have each requested a respective decrease in forward-link transmission power level by an amount at least as large as a respective threshold amount comprises:

determining that each of the number of other access terminals has sent to the RAN at least a second threshold number of consecutive power-decrement requests during a second time interval.

4. The method of claim 3, wherein determining that each of the number of other access terminals has sent to the RAN at least the second threshold number of consecutive power-decrement requests during the second time interval comprises:

determining that during the second time interval, transmissions from the RAN to at least one of the number of other access terminals on its respective forward link were made at a respective minimum allowed forward-link power level.

5. The method of claim 4, wherein decreasing the forward-link transmission power level to each of the number of other access terminals by a respective decremental amount comprises decreasing the respective minimum allowed forward-link power level for the at least one of the number of other access terminals by a respective decremental amount.

6. The method of claim 3, wherein at least a portion of the first time interval overlaps with at least a portion of the second time interval.

7. The method of claim 3, wherein (i) the wireless communication system operates according to a CDMA family of protocols, (ii) each of the power-increment requests is a power-up command sent in accordance with inner-loop power-control protocols, and (iii) each of the power-decrement requests is a power-down command sent in accordance with inner-loop power-control protocols.

8. The method of claim 7, wherein each of the first time interval and the second time interval corresponds to an integer number of transmission frames.

9. The method of claim 2, wherein determining that the given access terminal has sent to the RAN at least the first threshold number of consecutive power-increment requests during the first time interval in which the given access terminal was receiving forward-link transmission power at the maximum allowed forward-link power level for the given access terminal comprises:

determining that transmissions from the RAN to the given access terminal on a forward link to the given access terminal were made at the maximum allowed forward-link power level for the given access terminal during the first time interval.

10. The method of claim 2, wherein increasing the forward-link transmission power level to the given access terminal by the incremental amount comprises increasing the maximum allowed forward-link power level for the given access terminal by the incremental amount.

11. In a wireless communication system including a radio access network (RAN) that provides service to access terminals, a method of setting a forward-link transmission power level for at least one access terminal, the method comprising:

at the RAN, receiving a request from a given access terminal for a forward-link transmission power level that exceeds a threshold level, wherein receiving the request from the given access terminal for a forward-link transmission power level that exceeds a threshold level comprises (i) receiving a request from the given access terminal for a differential increase in forward-link transmission power, and (ii) determining that a sum of the differential increase and a current forward-link transmission power to the given access terminal exceeds the threshold level, the current forward-link transmission power to the given access terminal being a forward-link transmission power to the given access terminal when the request is received;

at the RAN, receiving from each of a number of other access terminals a request for a respective decrease in forward-link transmission power level by an amount at least as large as a respective threshold amount, the number being at least one;

at the RAN, increasing the forward-link transmission power level to the given access terminal by an incremental amount; and at the RAN, decreasing the forward-link transmission power level to each of the number of other access terminals by a respective decremental amount, wherein the sum of all the respective decremental amounts equals at least the incremental amount.

12. The method of claim 11, wherein receiving the request from the given access terminal for a forward-link transmission power level that exceeds a threshold level further comprises:

receiving from the given access terminal at least a first threshold number of consecutive power-increment requests during a first time interval in which transmissions from the RAN to the given access terminal on a forward link to the given access terminal were made at a maximum allowed forward-link power level for the given access terminal.

13. The method of claim 12, wherein receiving from each of the number of other access terminals a request for a respective decrease in forward-link transmission power level by an amount at least as large as a respective threshold amount further comprises:

receiving from each of the number of other access terminals at least a second threshold number of consecutive power-decrement requests during a second time interval.

14. The method of claim 13, wherein at least a portion of the first time interval overlaps with at least a portion of the second time interval.

15. The method of claim 13, wherein (i) the wireless communication system operates according to a CDMA family of protocols, (ii) each of the power-increment requests is a power-up command sent in accordance with inner-loop power-control protocols, and (iii) each of the power-decrement requests is a power-down command sent in accordance with inner-loop power-control protocols.

16. The method of claim 15, wherein each of the first time interval and the second time interval corresponds to an integer number of transmission frames.

17. The method of claim 12, wherein increasing the forward-link transmission power level to the given access terminal by the incremental amount comprises increasing the maximum allowed forward-link power level for the given access terminal by the incremental amount.

18. The method of claim 13, wherein, during the second time interval, transmissions from the RAN to at least one of the number of other access terminals on its respective forward link were made at a respective minimum allowed forward-link power level, and wherein decreasing the forward-link transmission power level to each of the number of other access terminals by a respective decremental amount comprises decreasing the respective minimum allowed forward-link power level for the at least one of the number of other access terminals by a respective decremental amount.

19. The method of claim 11, wherein the RAN includes at least one of (i) a base station, (ii) a radio node controller, (iii) a mobile switching center, and (iv) a home location register.

20. In a wireless communication system for providing service to access terminals, the wireless communication system comprising a radio access network (RAN) that includes at least one of (i) a base station, (ii) a radio node controller, (iii) a mobile switching center, and (iv) a home location register, an improvement comprising:

means for determining that a given access terminal is requesting a forward-link transmission power level that exceeds a threshold level wherein determining that the given access terminal is requesting a forward-link transmission power level that exceeds the threshold level comprises determining that at least a first threshold number of consecutive power-increment requests was received at the RAN from the given access terminal during a first time interval in which transmissions from the RAN to the given access terminal on a forward link to the given access terminal were made at a maximum allowed forward-link power level for the given access terminal;

means for determining that a number of other access terminals have each requested a respective decrease in forward-link transmission power level by an amount at least as large as a respective threshold amount, wherein the determined number is at least one, wherein determining that the number of other access terminals have each requested a respective decrease in forward-link transmission power level by an amount at least as large as a respective threshold amount comprises (i) determining that at least a second threshold number of consecutive power-decrement requests was received at the RAN from each of the number of other access terminals during a second time interval, and (ii) determining that, during the second time interval, transmissions from the RAN to at least one of the number of other access terminals on its respective forward link were made at a respective minimum allowed forward-link power level;

means for increasing the forward-link transmission power level to the given access terminal by an incremental amount, wherein increasing the forward-link transmission power level to the given access terminal by the incremental amount comprises increasing the maximum allowed forward-link power level for the given access terminal by the incremental amount; and means for decreasing the forward-link transmission power level to each of the number of other access terminals by a respective decremental amount, wherein the sum of all the respective decremental amounts equals at least the incremental amount, and wherein decreasing the forward-link transmission power level to each of the number of other access terminals by a respective decremental amount comprises decreasing the respective minimum allowed forward-link power level for the at least one of the number of other access terminals by a respective decremental amount.

21. The improvement of claim 20, wherein at least a portion of the first time interval overlaps with at least a portion of the second time interval.

22. The improvement of claim 20, wherein (i) the wireless communication system operates according to a CDMA family of protocols, (ii) each of the first time interval and the second time interval corresponds to an integer number of transmission frames, (iii) each of the power-increment requests is a power-up command sent in accordance with inner-loop power-control protocols, and (iv) each of the power-decrement requests is a power-down command sent in accordance with inner-loop power-control protocols.

* * * * *